Feb. 20, 1968  F. S. BILLIG ETAL  3,369,782
COOLED LEADING EDGE

Filed Oct. 5, 1965  2 Sheets-Sheet 1

FREDERICK S. BILLIG
STEPHEN E. GRENLESKI, Jr.
INVENTORS

BY Claude Funkhouser
ATTORNEY

Feb. 20, 1968    F. S. BILLIG ETAL    3,369,782
COOLED LEADING EDGE
Filed Oct. 5, 1965    2 Sheets-Sheet 2

FREDERICK S. BILLIG
STEPHEN E. GRENLESKI, Jr.
INVENTORS

BY Claude Funkhouser
ATTORNEY

3,369,782
COOLED LEADING EDGE
Frederick S. Billig and Stephen E. Grenleski, Jr., Silver Spring, Md., assignors to the United States of America as represented by the Secretary of the Navy
Filed Oct. 5, 1965, Ser. No. 493,279
6 Claims. (Cl. 244—117)

ABSTRACT OF THE DISCLOSURE

The invention relates to an internally cooled leading edge structure for hypersonic vehicles and includes a plurality of stainless steel tubes that are aligned in parallel relationship and bonded together. The corner portions of the tubes are aligned in clusters which are disposed in generally vertical planes perpendicular to the bonded portions of the tubes. A coating of metal is electroformed over the tubes to form an aerodynamic wedge-shaped structure. The rearmost portion of the wedge-shaped structure is provided with means, for example, a groove, to facilitate attachment of the leading edge structure to the main body of a hypersonic airfoil.

---

The present invention generally relates to an actively cooled aerodynamic surface and, more particularly, to an improved airfoil leading edge structure which can be actively cooled when subjected to elevated temperatures experienced in hypersonic flight.

Previous technological studies have indicated that airflow stagnation points occur along the leading edge regions of an airfoil in hypersonic flight. The presence of these stagnation points results in aerodynamic heating to the extent that structural integrity of the airfoil is threatened. At an airfoil test speed of March 5, temperatures as high as 1900 degrees Fahrenheit have been recorded. Such high temperatures can have serious effects upon the strength and stiffness of the airfoil structural material. Unprotected metal alloys are adequate for use in supersonic vehicles but more sophisticated designs are required for structural components used in vehicles operating at hypersonic speeds. The present invention utilizes actively cooled metal structures to relieve the presence of damaging high temperatures along leading edge regions. The application of a cooling system to a leading edge structure is severely limited by the narrow dimensions possessed by said structure. The cooling system of the present invention communicates coolant to a leading edge structure by a plurality of hypodermic tubes fabricated from a high-temperature resistant metal. The small diameter of the tubes advantageously permits them to be disposed within a vehicle structural component of extremely narrow cross-section. An aerodynamic geometry for the structure is accomplished by a coating of high temperature resistant metal electroformed over the tubes and machined to a typical leading edge configuration. The resultant structure is then positively fastened to an airfoil main body by conventional welding or silver soldering techniques. Conventional fastening techniques can be employed since high temperatures are dissipated, leaving structure of the weld intact and unaffected.

It is thus an object of this invention to provide an airfoil leading edge structure of minimum leading edge thickness capable of dissipating stagnation temperatures encountered in high speed flight.

A further object of this invention is to provide an airfoil leading edge structure which is readily replaceable when severely damaged.

A still further object of this invention is to provide an airfoil leading edge structure which retains a desired slender leading edge geometry if damaged in flight.

A still further object of this invention is to provide a manufacturing process for an actively cooled aerodynamic leading edge structure.

Other objects and features of the present invention will become apparent from the following description in conjunction with the accompanying drawings illustrating and describing preferred embodiments of the invention in which.

Figure 1:
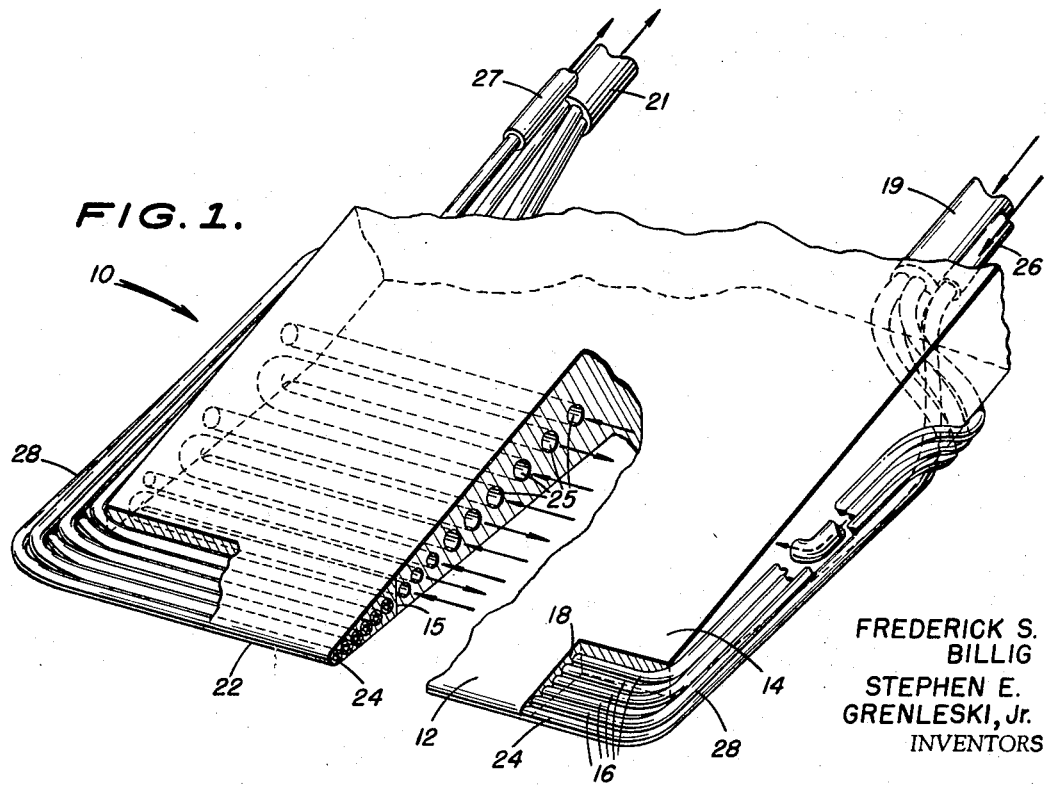
FIG. 1 is a perspective, partly in section, of a leading edge structure and related cooling apparatus according to the present invention, shown in conjunction with an airfoil main body.
Figure 4:
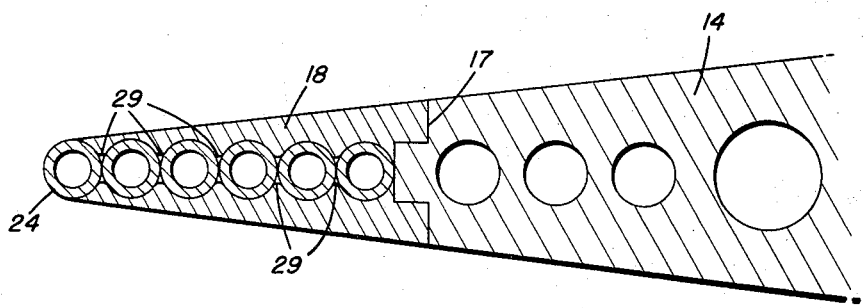
FIG. 4 is a cross-section of an airfoil main body and leading edge structure attached thereto by a tongue and groove arrangement.

With more particular reference to the drawings, there is shown in FIGURE 1, an exemplary portion of a hypersonic airfoil 10 comprised of a leading edge structure 12 and a principal airfoil main body 14. The leading edge structure is attached to the airfoil main body 14 by either a butt joint 15 or, as shown in FIGURE 4, by a tongue and groove arrangement 17. The leading edge structure 12 contains therein a plurality of hypodermic tubes 16 which have been fabricated to close tolerances from a high-temperature resistant metal. A wedge-shaped coating 18 of high-temperature resistant metal is electroformed over the plurality of the hypodermic tubes 16. The desired aerodynamic shape is accomplished by machining the wedge-shaped coating 18 to a typical leading edge configuration.

When elevated temperatures are experienced in hypersonic flight, a suitable coolant is circulated through the hypodermic tubes 16 to actively cool the leading edge structure 12. By experiment, water was found to be an adequate coolant, but any other circulating coolant may be employed. In the typical application of FIGURE 1, water is introduced to the hypodermic tubes 16 within the leading edge structure 12 by an inlet pipe partially shown at 19. The water is circulated through the tubes 16 and exited through a pipe 21. The leading edge 22 of the leading edge structure 12 is subjected to the highest stagnation temperatures. Thus the foremost hypodermic tube 24 is subjected to higher temperatures than the remainder of the hypodermic tubes 16. It was thus found that a pumping pressure of 1000 p.s.i. is required for adequate heat dissipation by the coolant within the foremost hypodermic tube 24, while a relatively lower pressure of 250 p.s.i. in the remainder of the hypodermic tubes 16 was sufficient. A separate inlet pipe 26 and outlet pipe 27, for the foremost hypodermic tube 24, enables the pumping pressure therein to be maintained at a value higher than the pressures within the remaining hypodermic tubes 16. Since the hypodermic tubes 16 are disposed in abutting parallel relationship, a maximum number of said tubes can be placed within the leading edge structure 12 to accomplish optimum heat dissipation. The solid airfoil main body 14 is cooled in substantially the same manner. A plurality of holes 25 allow circulation of a suitable coolant therethrough.

In the manufacture of the leading edge structure 12, the plurality of hypodermic tubes 16 are constructed to close tolerances from a high-temperature resistant metal. The most desirable metal is one which possesses a high thermal conductivity and a high melting point.

It is equally important that the metal retain its structural integrity at extremely elevated temperatures. A satisfactory metal was found to be Nickel 270 (99.9%), a commercially available form of high purity nickel. From this nickel a hypodermic tube size as small as 0.051" outside diameter and 0.041" bore diameter was fabricated. The bores of the hypodermic tubes 16 can be held to close tolerances to assure proper coolant flow. A plurality of the hypodermic tubes 16 are individually bent to a preliminary airfoil leading edge geometry. It is desirable that the hypodermic tubes 16 be assembled into a cluster so that they can be easily coupled to their common inlet pipe 19. Waterflow must curve 90 degrees at both entrance and exit, necessitating a cluster of tube passageways because of the limited end areas available. As shown in FIGURE 1, six of such tubes are first disposed into a flat plane 0.312 inch wide, parallel to the leading edge, curved 90 degrees at 28 into a cluster of tubes disposed in a generally vertical plane 0.166 inch wide, all within the wedge-shaped structure. Close tolerances must be held during the bending operation to insure that subsequent machining to a final airfoil leading edge geometry will not rupture the tubes. To prevent warping or possible collapse of the tubes, monofilament nylon strands are inserted into them prior to the bending operation. The hypodermic tubes are then bonded permanently together by silver soldering or spray plating a preliminary coating of metal between said tubes. Typical bonding coatings are shown at 29 in FIGURE 4. The hypodermic tubes are then inspected for improper bonding or for faulty adhesion or for voids in the nickel coating. After proper inspection, electroforming is continued until a final wedge-shaped coating of nickel has been formed.

It was found that the foremost tube 24 is sufficiently slender to serve as the leading edge of the ultimate airfoil. This is desirable since optimum cooling of the leading edge 22 is accomplished when the hypodermic tube 24 is in close proximity thereto. The dimensions of the hypodermic tube 24 can be held to close tolerances with the result that a constant leading edge geometry is maintained.

Figure 3:
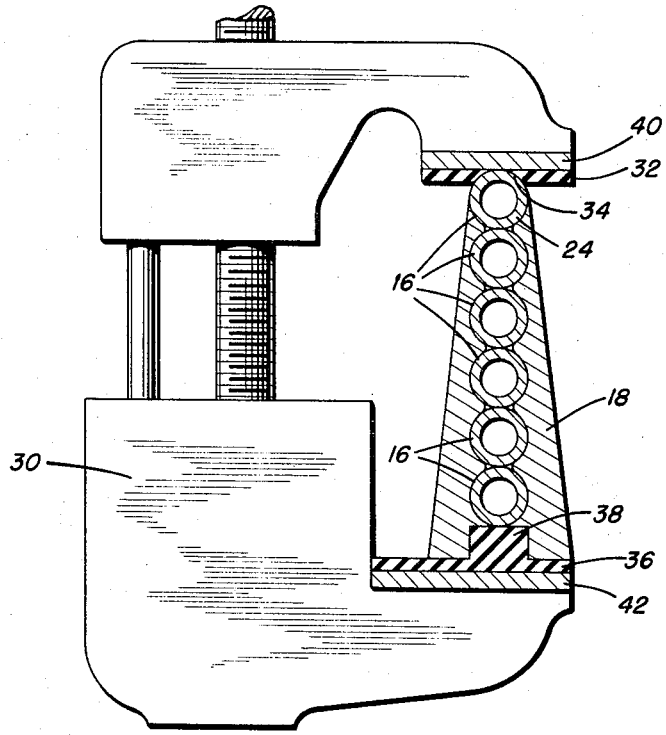
FIG. 3 is a side elevation, partly in section, illustrating a plurality of coolant tubes positioned in a clamping apparatus for electrodeposition of the outer coating employed.

In FIGURE 3 a clamping device 30 positions the plurality of hypodermic tubes 16 for the final wedge-shaped coating 18 of electroformed Nickel 270 (99.9%). Along the entire length of the foremost tube 24 is clamped a soft rubber shield 32 having a rounded groove portion 34. The shield 32 prevents electrodeposition from taking place along the surface of the foremost tube 24 which is covered by the rounded grooved portion 34. Thus excessive machining of the metal formed upon the foremost tube 24 is eliminated. The danger of damaging the leading edge geometry of the foremost tube 24 during the machining process is minimized. Excessive machining is further eliminated through the use of a rubber shield 36 having a tongued-shaped portion 38. The shield 36 is clamped against the rearmost tube of the group of hypodermic tubes 16. When electrodeposition takes place a groove is formed within the resulting wedge-shaped structure. The groove is part of a tongue and groove arrangement which is employed to attach the resultant structure to an airfoil main body. As shown in FIG. 4, the wedge-shaped structure 18 is attached to the airfoil main body 14 by a tongue and groove arrangement 17. In the typical embodiment of FIGURE 3, the shields 32 and 36 are fastened to metal backing plates 40 and 42 respectively. The backing plates insure intimate contact between the shields 32 and 36 and the plurality of hypodermic tubes 16. A plurality of clamping devices 30 are spaced equidistantly along the lengths of the backing plates to apply sufficient clamping pressure. Electrodeposition is then permitted until the desired wedge-shaped structure is attained. The wedge-shaped structure is then machined to a final leading edge geometry and attached to an airfoil main body.

An alternative technique for bonding the hypodermic tubes together eliminates the need for the preliminary bonding coatings 29. The alternative technique employs a pair of plastic clamps which are secured to the tubes, aligning them into a single plane. The shields 32 and 36 are then secured to the tubes by the plurality of clamping devices 30 as described. With the tubes maintained in clamped relationship, Nickel 270 (99.9%) is electroformed over them until the pair of plastic clamps can be removed without disturbing the desired relationship. After the plastic clamps have been removed, the final wedge-shaped coating of nickel is electroformed as described.

Figure 2:
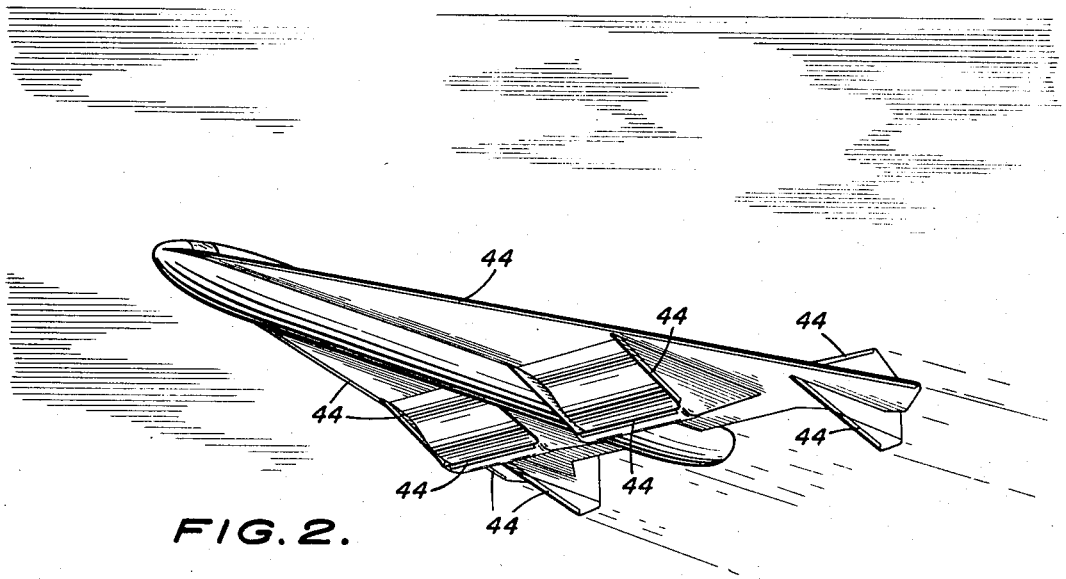
FIG. 2 is a view in perspective illustrating a hypersonic vehicle having leading edges on which the invention is typically utilized.

FIGURE 2 of the drawing illustrates the use of the leading edge structure of the present invention in the leading edges 44 of a hypersonic vehicle. Often, during hypersonic flights, the leading edges of such a vehicle are struck and severely damaged by meteorites and other solid matter particles. The leading edge structure of the present invention, if damaged, may be removed and a new section welded in its place without costly delay or need for specialized techniques and equipment. Also, if merely the foremost tube 24 is damaged, the hypodermic tube disposed immediately behind provides a leading edge geometry, since the change in the leading edge radius of curvature is negligible for a large airfoil.

While a preferred modification of the present invention has been described, it is to be understood that the foregoing description was given solely for illustration and that other modifications may be practiced within the scope of the appended claims.

What is claimed is:

1. An actively cooled aerodynamic leading edge structure comprising,
    a foremost hypodermic metal tube having an outer diameter of slender aerodynamic geometry,
    a plurality of similar hypodermic metal tubes in parallel relationship to said foremost metal tube,
    said foremost metal tube and said plurality of similar tubes being bonded together, and
    a coating of high temperature resistant metal on said metal tubes and having an aerodynamic leading edge geometry,
    said hypodermic tubes adapted to receive a coolant circulating therethrough for actively cooling said leading edge structure.

2. An airfoil leading edge structure comprising, in combination,
    a plurality of hypodermic high-temperature resistant tubes bonded together, said tubes having their midportions aligned parallel to each other and their end portions clustered in vertical planes perpendicular to the midportions of said tubes,
    a coating of high-temperature resistant metal over the midportions of said tubes and over the end portions of said tubes, and
    said coating of high-temperature resistant metal having an aerodynamic shape,
    said tubes adapted to receive a coolant circulating therethrough for active dissipation of heat.

3. A method of making a replaceable leading edge structure, including the steps of,
    bending a series of hypodermic tubes to an aerodynamic geometry,
    bonding the tubes to each other in parallel relationship,
    depositing a wedge-shaped coating of high purity metal over said tubes,
    machining said coating to a final aerodynamic geometry, and
    machining the rearmost surface of the coating to conform to a main body portion of an airfoil.

4. In the manufacture of a leading edge structure, the method comprising,
    forming a metal tube of hypodermic dimensions into a foremost leading edge,
    forming a plurality of like metal tubes of hypodermic dimension into parallel relationship behind said foremost tube, aligning the corner portions of said tubes into clusters disposed in vertical planes perpendicular to the foremost leading edge, electroforming a coating of metal over said tubes to form a wedge-shaped structure having vertical end sections which cover the corner portion clusters of said tubes, machining a surface on the rearmost portion of said wedge-shaped structure for positive fastening to an airfoil main body, and machining said wedge-shaped structure to a desired aerodynamic geometry.

5. A method of manufacturing an airfoil leading edge structure, comprising bending an aerodynamically slender first hypodermic tube of high-temperature resistant metal to form a leading edge, bonding together a plurality of additional hypodermic tubes in parallel relationship to said first tube, electroforming a high-temperature resistant material over said hypodermic tubes, machining said material to an aerodynamic leading edge configuration, and machining a surface on said material for attachment to an airfoil main body.

6. The structure recited in claim 2 wherein said coating is provided with means for fastening the leading edge structure to an airfoil main body.

References Cited
UNITED STATES PATENTS

| | | | |
|---|---|---|---|
| 1,791,331 | 2/1931 | Stowe | 244—134 |
| 3,010,398 | 11/1961 | Parlanti | 244—117 |
| 3,062,148 | 11/1962 | Le Bel | 244—117 |
| 3,129,754 | 4/1964 | Menzel | 244—117 |
| 3,145,000 | 8/1964 | Mackie | 244—117 |

MILTON BUCHLER, *Primary Examiner.*

T. W. BUCKMAN, *Assistant Examiner.*